US012611999B2

(12) United States Patent　(10) Patent No.: US 12,611,999 B2
Moriya　(45) Date of Patent: Apr. 28, 2026

(54) DRIVE DEVICE AND BOOT

(71) Applicant: HI-LEX Corporation, Hyogo (JP)

(72) Inventor: Yohei Moriya, Hyogo (JP)

(73) Assignee: HI-LEX Corporation, Hyogo (JP)

( * ) Notice: Subject to any disclaimer, the term of this patent is extended or adjusted under 35 U.S.C. 154(b) by 162 days.

(21) Appl. No.: 18/683,813

(22) PCT Filed: Mar. 31, 2022

(86) PCT No.: PCT/JP2022/016435
§ 371 (c)(1),
(2) Date: Feb. 15, 2024

(87) PCT Pub. No.: WO2023/021784
PCT Pub. Date: Feb. 23, 2023

(65) Prior Publication Data
US 2025/0121782 A1　Apr. 17, 2025

(30) Foreign Application Priority Data

Aug. 19, 2021　(JP) ................................. 2021-134088

(51) Int. Cl.
B60R 16/02 (2006.01)
B60J 5/10 (2006.01)
E05F 15/616 (2015.01)
(52) U.S. Cl.
CPC ........... B60R 16/0222 (2013.01); B60J 5/106 (2013.01); E05F 15/616 (2015.01); E05Y 2900/546 (2013.01)

(58) Field of Classification Search
CPC .. B60R 16/0222; B60R 16/0215; B60J 5/047; H02G 3/04
See application file for complete search history.

(56) References Cited

U.S. PATENT DOCUMENTS

2019/0169901 A1 * 6/2019 Yamagata ................. E05F 1/04

FOREIGN PATENT DOCUMENTS

JP　　2016-141956　　8/2016
JP　　　6768401　　10/2020

* cited by examiner

*Primary Examiner* — Timothy J Thompson
*Assistant Examiner* — Amol H Patel

(57) ABSTRACT

Provided is a drive device for opening and closing opening/closing body 2 supported by vehicle body 3 in an openable and closable manner. The drive device includes drive device main body 11 and boot 12. The device main body 11 is connected to vehicle body 3 and opening/closing body 2, and telescopic. A wire extending from drive device main body 11 passes through the inside of boot 12 including boot main body 31 and attachment part 32. Attachment part 32 is disposed at the end of boot main body 31 and attached to drive device main body 11, and includes protruding part 42 that protrudes toward the outside of drive device main body 11.

9 Claims, 17 Drawing Sheets

DRIVE DEVICE AND BOOT

TECHNICAL FIELD

The present invention relates to a drive device and a boot.

BACKGROUND ART

In recent years, drive devices have been used for electrically opening and closing an opening/closing body such as a back door of an automobile. In the drive device for the opening/closing body, for example, a motor extends and retracts the inner cylinder relative to the outer cylinder to open and close the opening/closing body (see, for example, Patent Literature (hereinafter, referred to as PTL) 1). A drive device as described in PTL 1 is provided with a boot through which a wire for driving a motor passes.

CITATION LIST

Patent Literature

PTL 1
Japanese Patent Application Laid-Open No. 2016-141956

SUMMARY OF INVENTION

Technical Problem

The drive device for opening and closing the back door as described above preferably has a structure such that rainwater from the back door does not accumulate in the boot.

An object of the present disclosure is to provide a drive device and a boot capable of preventing rainwater from accumulating in the boot.

Solution to Problem

A plurality of aspects will be described below as means for solving the problem. These aspects can be arbitrarily combined as necessary.

The drive device according to the first aspect is a drive device for opening and closing an opening/closing body that is supported by a vehicle body in an openable and closable manner, and includes a drive device main body and a boot. The drive device main body is connected to the vehicle body and the opening/closing body, and is telescopic. A wire extending from the drive device main body passes through the inside of the boot. The boot includes a boot main body and an attachment part. The boot main body configured to be attachable to the vehicle body. The attachment part is disposed at the end of the boot main body and is attached to the drive device main body. The attachment part includes a protruding part. The protruding part protrudes toward the outside of the drive device main body.

With such a configuration, rainwater that has flowed along the boot main body and reached the attachment part is discharged from the protruding part, thereby preventing rainwater from accumulating in the boot.

The drive device according to the second aspect is the drive device according to the first aspect, in which the protruding part includes an inclined surface. The inclined surface is provided on the boot main body side and is inclined with respect to the extension/retraction direction of the drive device main body. The inclined surface is formed so as to approach the drive device main body as the distance from the inclined surface to the tip part of the protruding part decreases.

With such a configuration, rainwater that has flowed from the boot main body is discharged from the tip of the protruding part by allowing the rainwater to flow along the inclined surface.

The portion of the drive device main body where the boot is attached has a structure that is inclined with respect to the end surface of the drive device main body according to the attachment angle of the boot, thereby achieving less space for attaching the boot. In the present disclosure, the boot can be attached to the drive device main body by gripping the inclined surface. Therefore, the boot can be easily attached even when the space for attaching the boot is small.

The drive device according to the third aspect is the drive device according to the first aspect, in which the protruding part includes a pressed part. The pressed part is provided on the boot main body side and is pressed during attachment of the boot to the drive device main body.

With such a configuration, for attaching the boot to the drive device main body, the boot can be attached to the drive device main body by grasping the pressed part and pressing the pressed part toward the drive device main body side. Therefore, the boot can be easily attached even when the space for attaching the boot is small.

The drive device according to the fourth aspect is the drive device according any one of the first to third aspects, in which the protruding part is disposed on the outer peripheral surface of the attachment part. The protruding part includes a tip part and a guide surface. The guide surface is disposed at the end of the protruding part in the circumferential direction of the protruding part and connects the outer peripheral surface with the tip part.

With such a configuration, rainwater that has flowed from the boot main body is discharged from the tip of the protruding part by allowing the rainwater to flow along guide surface.

The drive device according to the fifth aspect is the drive device according any one of the first to fourth aspects, in which the attachment part is attached to the drive device main body by fitting. The drive device main body includes a fitted part to which the attachment part fits. The protruding part is configured to be capable of coming into contact with the end part of the drive device main body.

With such a configuration, when the boot is attached to the drive device main body by fitting, it is possible to limit the amount of insertion of the attachment part. Therefore, the boot can be easily attached to the drive device main body. It is also possible to limit the sway of the boot accompanied by the opening and closing of the opening/closing body, thereby stabilizing the attached posture of the boot and preventing the boot from coming off the drive device main body.

The drive device according to the sixth aspect is the drive device according to the first aspect, in which the drive device main body includes a telescopic part and an attachment end part. The attachment end part protrudes from the end surface (in the extension/retraction direction) of the telescopic part, and the attachment part of the boot is attached to the attachment end part.

With such a configuration, rainwater that has flowed along the boot main body and reached the attachment part is discharged from the protruding part, thereby preventing rainwater from accumulating in the boot.

The boot according to the seventh aspect is a boot through which a wire of a drive device for opening and closing an opening/closing body passes, and the opening/closing body is supported by a vehicle body in an openable and closable manner. The boot includes a boot main body and an attachment part. The boot main body configured to be attachable to the vehicle body. The attachment part is disposed at the end of the boot main body and configured to be attachable to the drive device main body. The attachment part includes a protruding part. In a state in which the protruding part is attached to the drive device main body, the protruding part protrudes toward the outside of the drive device main body.

With such a configuration, rainwater that has flowed along the boot main body and reached the attachment part is discharged from the protruding part, thereby preventing rainwater from accumulating in the boot.

Advantageous Effects of Invention

The present disclosure can provide a drive device and a boot capable of preventing rainwater from accumulating in the boot.

DESCRIPTION OF EMBODIMENTS

Hereinafter, a drive device according to an embodiment of the present invention will be described below with reference to the drawings.

Configuration

Outline of Drive Device

Figure 1:
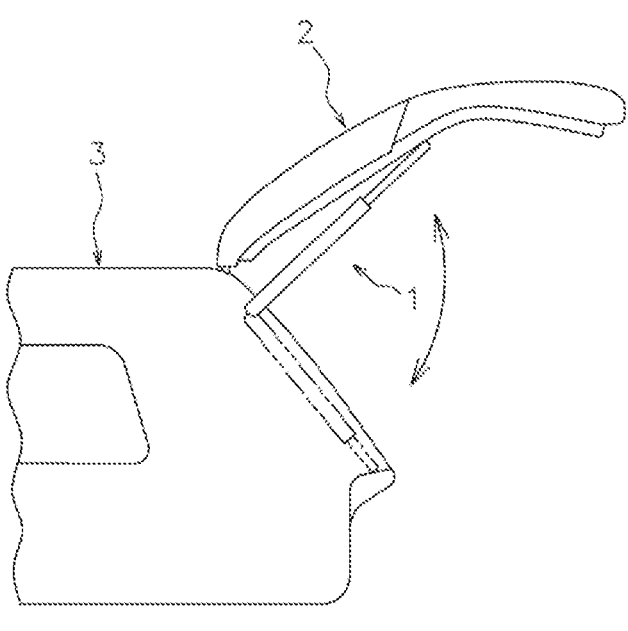
FIG. 1 is a schematic view illustrating a state in which a drive device according to an embodiment of the present disclosure is attached to a vehicle.

FIG. 1 is a schematic side view of a rear part of a vehicle body.

Drive device 1 is a device for opening and closing opening/closing body 2 that is supported by vehicle body 3 in an openable and closable manner. Drive device 1 is connected at its base end to vehicle body 3, which is a fixed object, and connected at its tip to opening/closing body 2, in such a way that opening/closing body 2 is driven by the driving of drive device 1, thereby opening and closing opening/closing body 2. In the present embodiment, drive device 1 is fixed so as to perform a turning operation centered on the connection part with the fixed object, however, drive device 1 does not need to perform a turning operation as long as drive device 1 is fixed to vehicle body 3.

In the example illustrated in FIG. 1, opening/closing body 2 is a back door for opening and closing the rear part of vehicle body 3. Opening/closing body 2 is not limited to this configuration, and may be, for example, a sliding door that opens and closes a side opening, or a window such as an automatic opening/closing window.

Drive device 1 is a device that drives opening/closing body 2 by converting rotational motion of a motor or the like into linear telescopic motion. Drive device 1 includes one end and the other end in the length direction. The one end is connected to opening/closing body 2 on the side closer to the inside of the vehicle body, and the other end is connected to the rear end of vehicle body 3. Drive device 1 can extend and retract in the length direction to drive opening/closing body 2, and is provided so as to move opening/closing body 2 to a fully opened position or a fully closed position.

Drive device 1 is not particularly limited in the placed position or the number thereof for use as long as opening/closing body 2 can be opened and closed. That is, one drive device 1 may be disposed on each of the left and right sides of vehicle body 3 and opening/closing body 2, or on one of the left and right sides of vehicle body 3 and opening/closing body 2. Two or more drive devices 1 may be disposed. Further, drive device 1 and a gas damper may be used in combination.

Details of Drive Device

Figure 2:
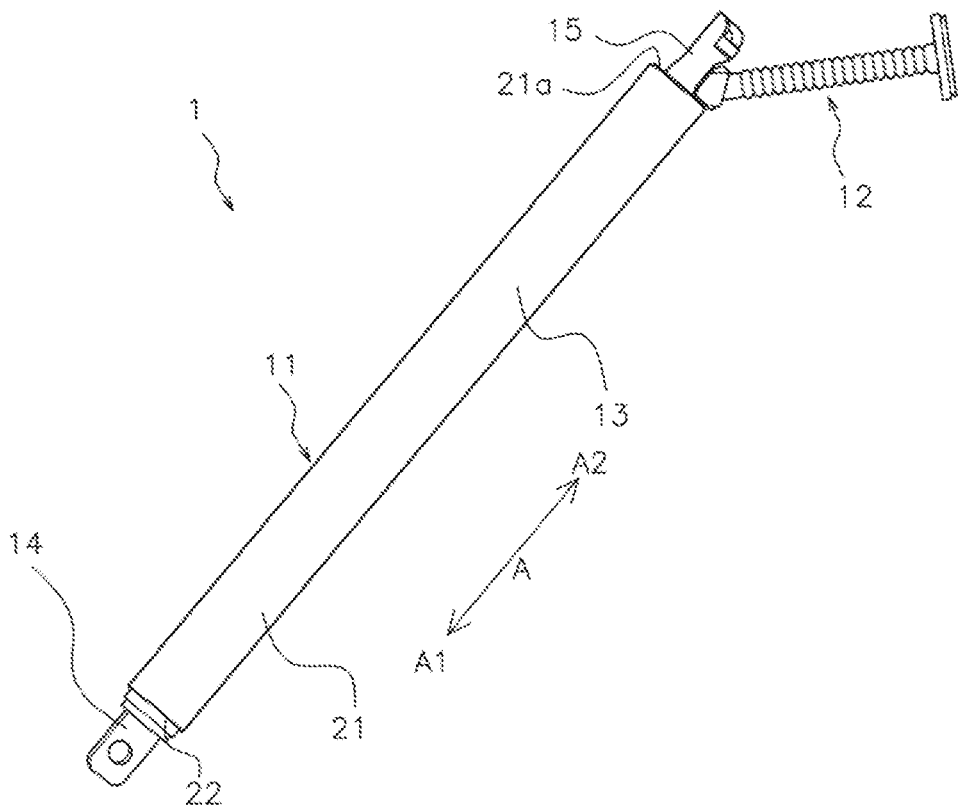
FIG. 2 is a perspective view of the drive device according to the embodiment of the present disclosure.

FIG. 2 is an overall perspective view of drive device 1 of the present embodiment. Drive device 1 includes drive device main body 11 and boot 12. Drive device main body 11 is connected to vehicle body 3 and opening/closing body 2, and is extendable and retractable (i.e., telescopic). A wire extending from drive device main body 11 passes through the inside of boot 12. Boot 12 is attached at both ends thereof to drive device main body 11 and vehicle body 3, respectively, and protects the wire from rainwater and the like.

Drive Device Main Body 11

Drive device main body 11 includes telescopic part 13, end part on the opening/closing body side (herein also referred to as "opening/closing body side end part") 14, and vehicle body side end part 15 (an example of an attachment end part). Opening/closing body 2 opens and closes with respect to vehicle body 3 by retraction and extension of telescopic part 13. Opening/closing body side end part 14 is disposed at one end of telescopic part 13. Opening/closing body side end part 14 is rotatably attached to opening/closing body 2. Vehicle body side end part 15 is rotatably attached to vehicle body 3.

Telescopic part 13 includes outer cylinder part 21 and inner cylinder part 22. Inner cylinder part 22 is inserted inside outer cylinder part 21. Inner cylinder part 22 moves forward and backward relative to outer cylinder part 21 by the driving of a motor disposed inside outer cylinder part 21.

Opening/closing body side end part 14 is disposed at the tip of inner cylinder part 22. Outer cylinder part 21 includes end surface 21*a* on the opposite side to the end into which inner cylinder part 22 is inserted. Extension/retraction direction A of telescopic part 13 is illustrated. Of extension/retraction direction A, the side on which opening/closing body side end part 14 is located is indicated by first extension/retraction direction A1, and the side opposite to first extension/retraction direction A1 is indicated by second extension/retraction direction A2.

Figure 3:
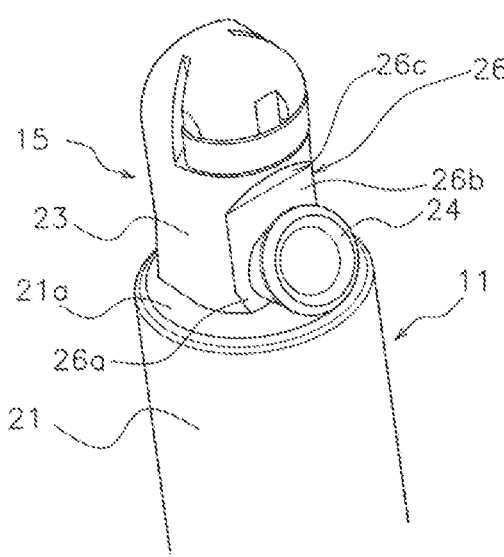
FIG. 3 is a perspective view illustrating an end part of a drive device main body, the end part on the vehicle body side (herein also referred to as "vehicle body side end part") according to the embodiment of the present disclosure.
Figure 4:
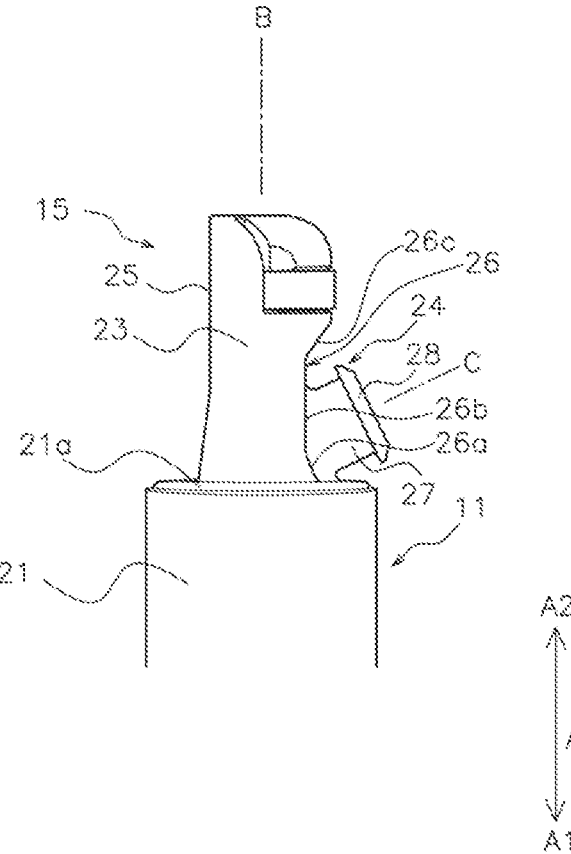
FIG. 4 is a side view illustrating the vehicle body side end part of the drive device main body according to the embodiment of the present disclosure.

FIG. 3 is an enlarged view of vehicle body side end part 15. FIG. 4 is a side view of vehicle body side end part 15. Vehicle body side end part 15 protrudes from end surface 21*a*.

Vehicle body side end part 15 includes end part main body 23 and boot attachment part 24 (an example of a part to be fitted (referred to as "fitted part"). As illustrated in FIG. 4, end part main body 23 protrudes from end surface 21*a* in second extension/retraction direction A2. Boot attachment part 24 protrudes from end part main body 23 in an inclined direction inclined with respect to second extension/retraction direction A2.

As illustrated in FIG. 4, end part main body 23 includes flat surface part 25 and side surface part 26. Flat surface part 25 is disposed along extension/retraction direction A. A circular recess (not illustrated) is formed in flat surface part 25 of end part main body 23. Drive device main body 11 is rotatably attached to vehicle body 3 by inserting a protrusion disposed on vehicle body 3 into the recess.

Side surface part 26 is formed in end part main body 23 on the root side (in the vicinity of end surface 21*a*). As illustrated in FIG. 4, side surface part 26 is formed in a recessed shape in end part main body 23. Side surface part 26 includes first main body side portion 26*a*, second main body side portion 26*b*, and third main body side portion 26*c*. First main body side portion 26*a* is an inclined surface formed from end surface 21*a* and inclined with respect to extension/retraction direction A. First main body side portion 26*a* is formed to be inclined toward central axis B of telescopic part 13 as the distance from first main body side portion 26*a* to end surface 21*a* increases. Second main body side portion 26*b* is a flat surface formed from the end (located opposite to end surface 21*a*) of first main body side portion 26*a* toward second extension/retraction direction A2. Second main body side portion 26*b* is formed along extension/retraction direction A. Third main body side portion 26C is an inclined surface formed from the end (located on the second extension/retraction direction A2 side) of second main body side portion 26*b* and inclined with respect to extension/retraction direction A. Third main body side portion 26*c* is inclined away from central axis B as the distance from third main body side portion 26*c* to end surface 21*a* increases. Herein, terms such as "along," "parallel," "perpendicular," and "toward" do not have strict meanings and include errors, and include concepts that can generally be recognized as "along," "parallel," "perpendicular," and "toward" according to social conventions.

Boot 12 is attached to boot attachment part 24. In the extension/retraction direction of telescopic part 13 (see arrow A), boot attachment part 24 is disposed on side surface part 26 of end part main body 23. Specifically, as illustrated in FIG. 4, boot attachment part 24 is disposed at first main body side portion 26*a* and second main body side portion 26*b* of side surface part 26. Boot attachment part 24 is provided to be inclined with respect to extension/retraction direction A. By providing boot attachment part 24 on side surface part 26 formed in a recessed shape in this manner, attachment part 32 of boot 12 can be attached to boot attachment part 24 without causing attachment part 32 to protrude significantly from outer cylinder part 21. In this manner, it becomes possible to attach attachment part 32 of boot 12 to boot attachment part 24 in a small space.

As illustrated in FIG. 4, boot attachment part 24 includes cylinder part 27 and projection part 28. Cylinder part 27 is disposed across first main body side portion 26a and second main body side portion 26b. Cylinder part 27 is a cylinder centered on central axis C. Cylinder part 27 is formed in a circular shape when viewed from the direction along central axis C. Cylinder part 27 is disposed to be inclined with respect to extension/retraction direction A in such a way that the distance from central axis C of cylinder part 27 to central axis B increases as the distance from central axis C to end surface 21a increases. The inclination of cylinder part 27 is set at a predetermined angle in such a way that the wires from the motor and the like led out from boot attachment part 24 can be routed without being bent when drive device 1 is attached to a vehicle. Projection part 28 is fitted into below-described groove part 54 of boot 12. As illustrated in FIG. 4, projection part 28 is formed at the tip of cylinder part 27. Projection part 28 is formed to spread outward from the entire circumference of the tip of cylinder part 27. Projection part 28 is formed to be inclined toward the base end (side surface part 26 side) of cylinder part 27 from the inside to the outside of cylinder part 27. Although cylinder part 27 is formed in a circular shape when viewed from the direction along central axis C, cylinder part 27 may be formed in an elliptical shape. The shape of cylinder part 27 may be such that watertightness can be maintained when boot 12 is attached.

Boot 12

Figure 5:
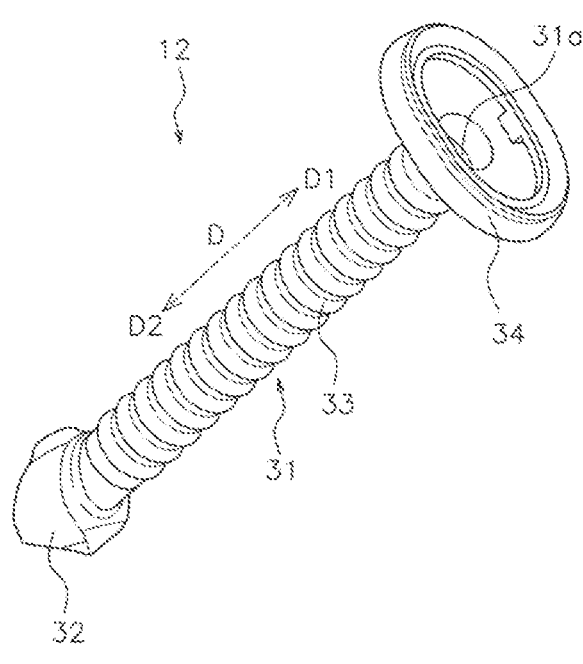
FIG. 5 is a perspective view of a boot according to the embodiment of the present disclosure.
Figure 6:
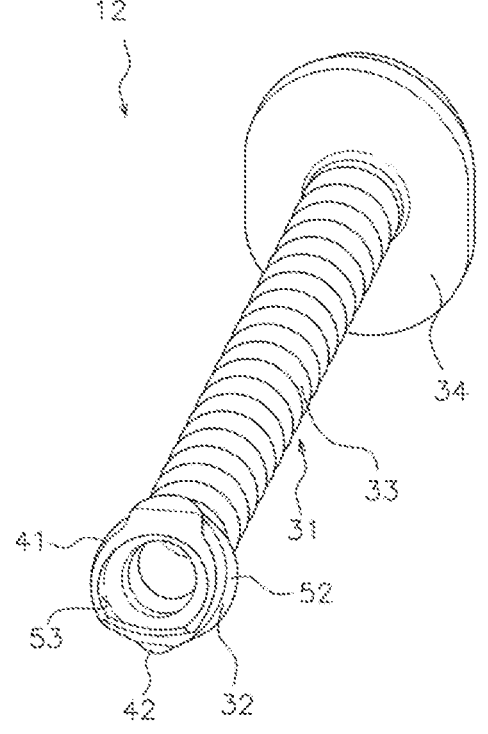
FIG. 6 is a perspective view of the boot according to the embodiment of the present disclosure.
Figure 7:
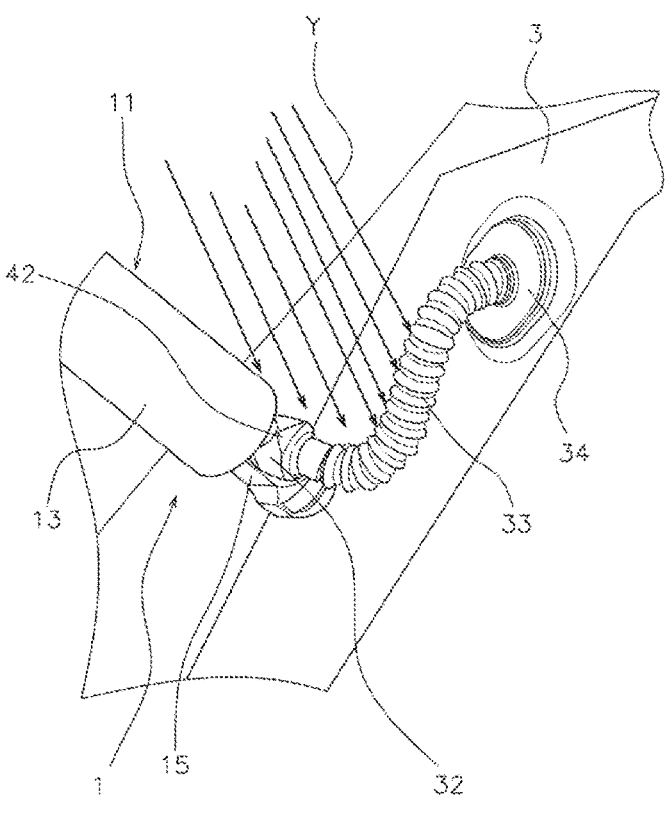
FIG. 7 is a perspective view illustrating a state in which the drive device according to the embodiment of the present disclosure is attached to the vehicle and an opening/closing body is opened.
Figure 8:
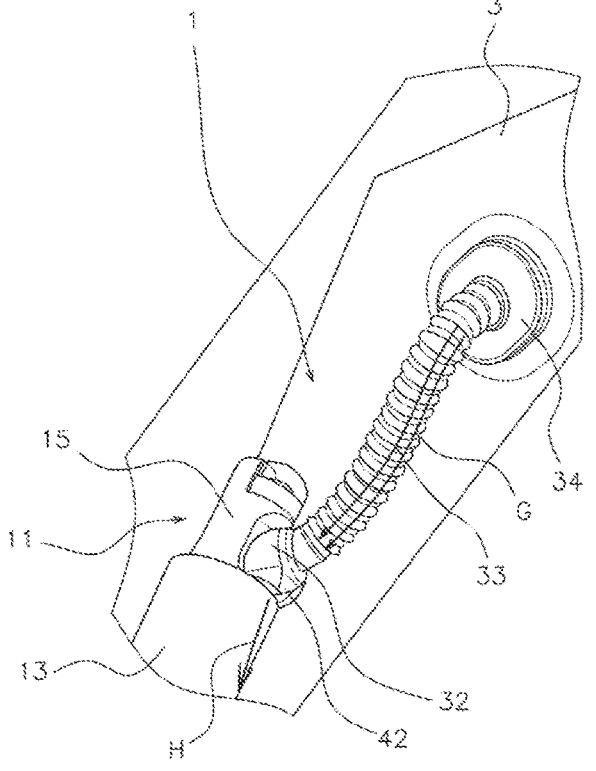
FIG. 8 is a perspective view illustrating a state in which the drive device according to the embodiment of the present disclosure is attached to the vehicle and the opening/closing body is closed.

FIG. 5 is a perspective view illustrating boot 12. FIG. 6 is a perspective view of boot 12 viewed from a different direction from that of FIG. 5. FIG. 7 is a perspective view illustrating a state in which drive device 1 is attached to vehicle body 3 and opening/closing body 2 and opening/closing body 2 is opened. FIG. 8 is a perspective view illustrating a state in which drive device 1 is attached to vehicle body 3 and opening/closing body 2 and opening/closing body 2 is closed.

Boot 12 is formed of an elastic member such as rubber. As illustrated in FIGS. 5 and 6, boot 12 includes boot main body 31 and attachment part 32. A wire extending from drive device main body 11 passes through the inside of boot main body 31. Attachment part 32 is disposed at the end of boot main body 31 and attached to drive device main body 11.

Boot Main Body 31

Figure 11A:
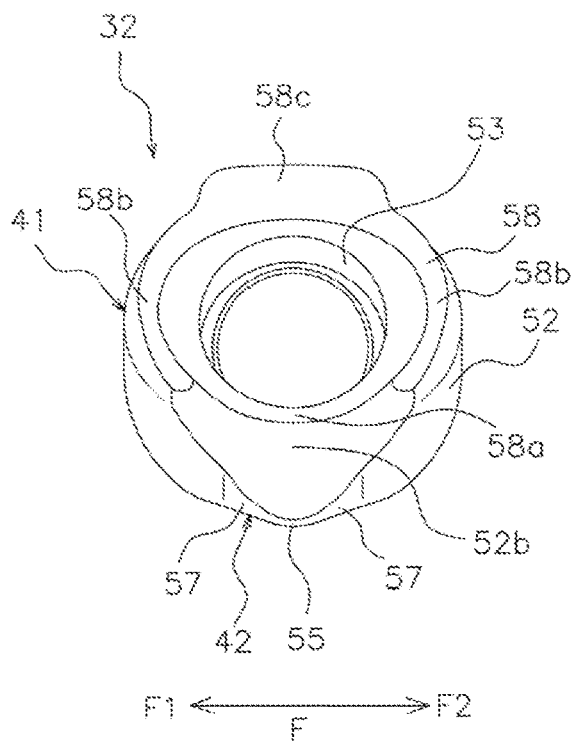
FIG. 11A is a front view of the attachment part according to the embodiment of the present disclosure.
Figure 11B:
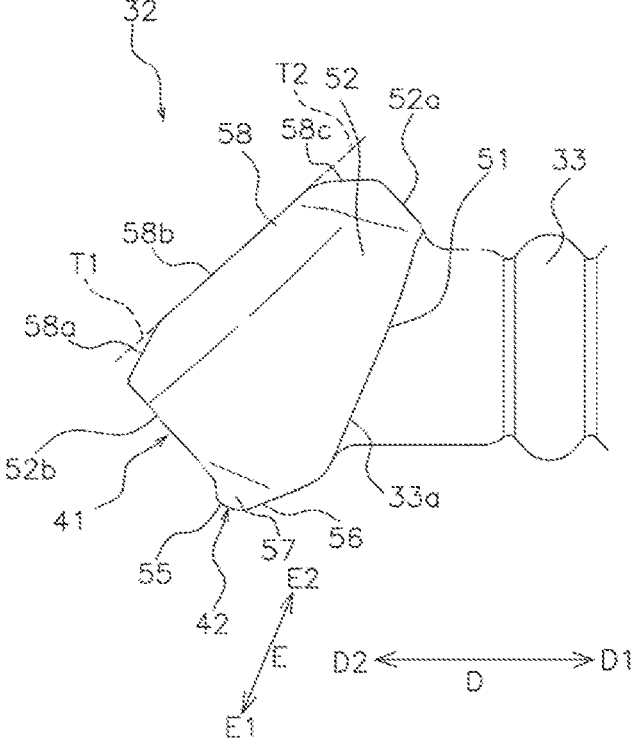
FIG. 11B is a side view of the attachment part according to the embodiment of the present disclosure.

As illustrated in FIG. 5, insertion hole 31a through which an electric wire is inserted is provided inside boot main body 31. As illustrated in FIGS. 5 and 6, boot main body 31 includes bellow part 33 and vehicle body attachment part 34. As illustrated in FIGS. 7 and 8, bellow part 33 curves in accordance with the rotation of drive device 1 accompanied by the opening and closing of opening/closing body 2. As illustrated in FIG. 11B described below, end 33a of bellow part 33 on the attachment part main body 41 side is formed to be inclined with respect to a direction perpendicular to longitudinal direction D (the longitudinal direction when bellow part 33 is extended linearly).

As illustrated in FIGS. 5 and 6, vehicle body attachment part 34 is disposed at an end of bellow part 33. Vehicle body attachment part 34 is formed outward from the periphery of the end of bellow part 33. Vehicle body attachment part 34 has a substantially elliptical shape. As illustrated in FIGS. 7 and 8, vehicle body attachment part 34 is attached to vehicle body 3. Vehicle body attachment part 34 is fitted into a recess (not illustrated) formed in vehicle body 3, for example. A hole, through which a wire passes, is formed inside this recess, and the wire passing through boot 12 is inserted into the hole.

Attachment Part 32

Figure 9:
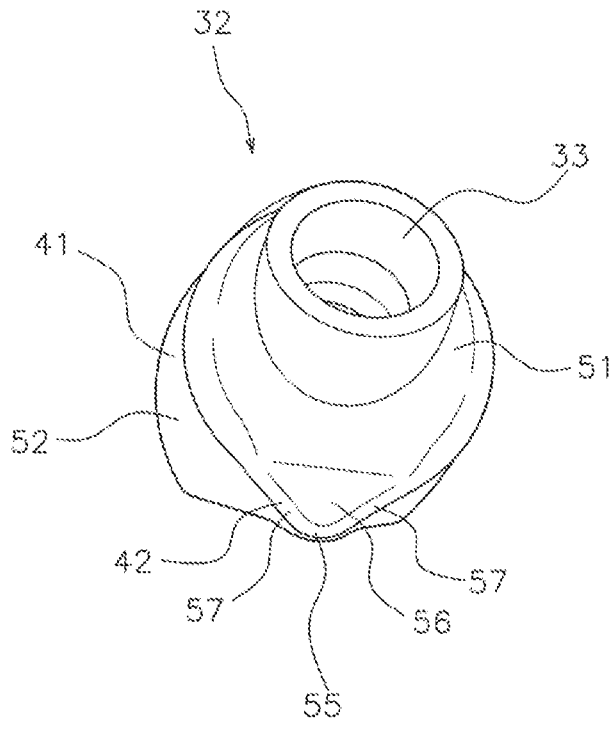
FIG. 9 is a perspective view of an attachment part according to the embodiment of the present disclosure.
Figure 10:
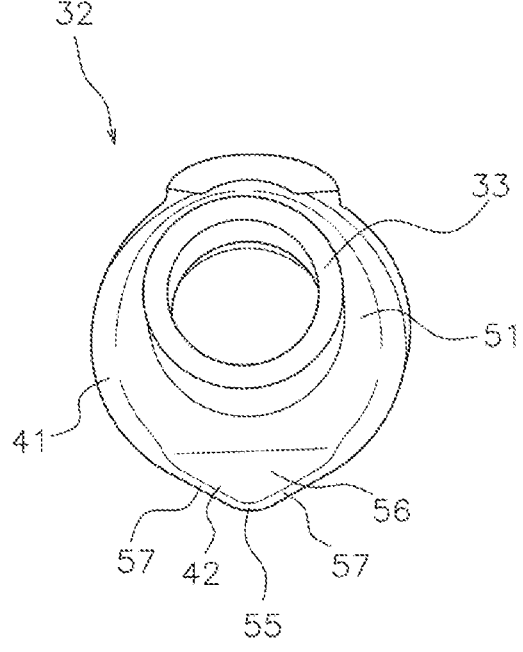
FIG. 10 is a perspective view of the attachment part according to the embodiment of the present disclosure.
Figure 11C:
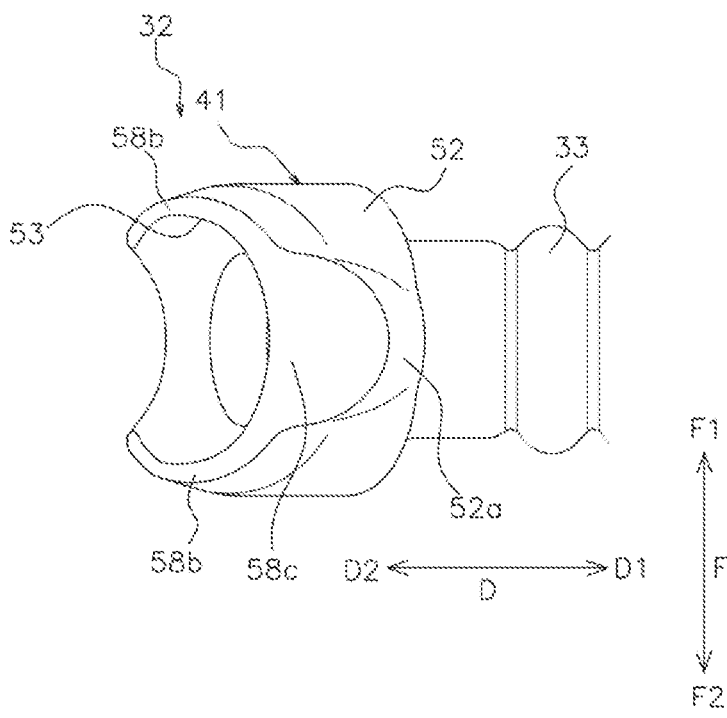
FIG. 11C is a top view of the attachment part according to the embodiment of the present disclosure.
Figure 11D:
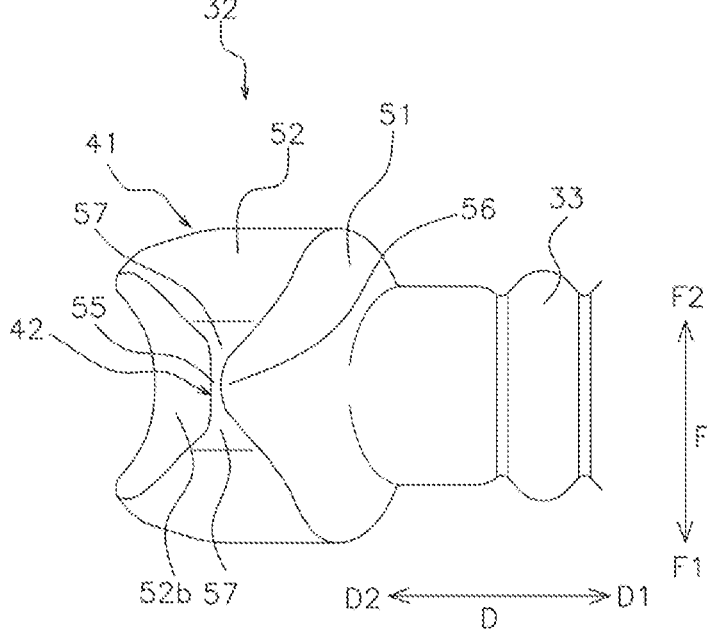
FIG. 11D is a back view of the attachment part according to the embodiment of the present disclosure.
Figure 12:
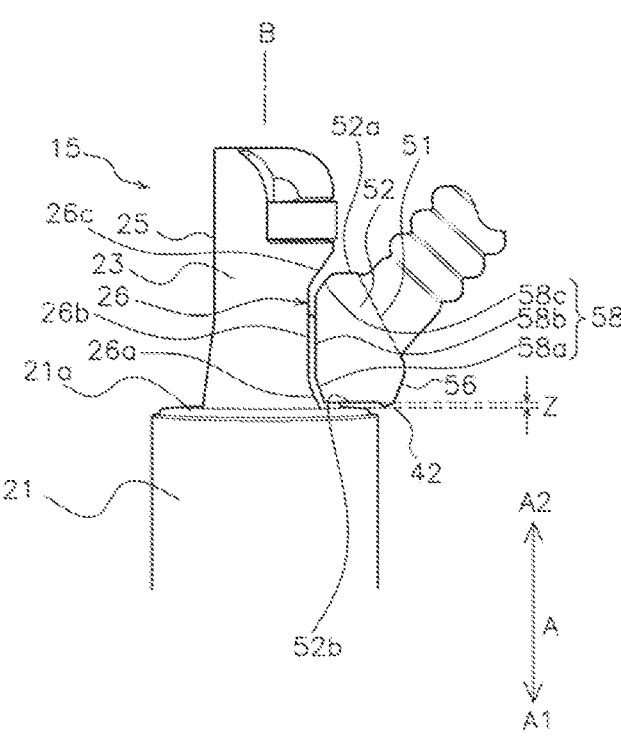
FIG. 12 is a side view illustrating a state in which the attachment part of the boot according to the embodiment of the present disclosure is attached to a boot attachment part of the drive device main body.
Figure 13:
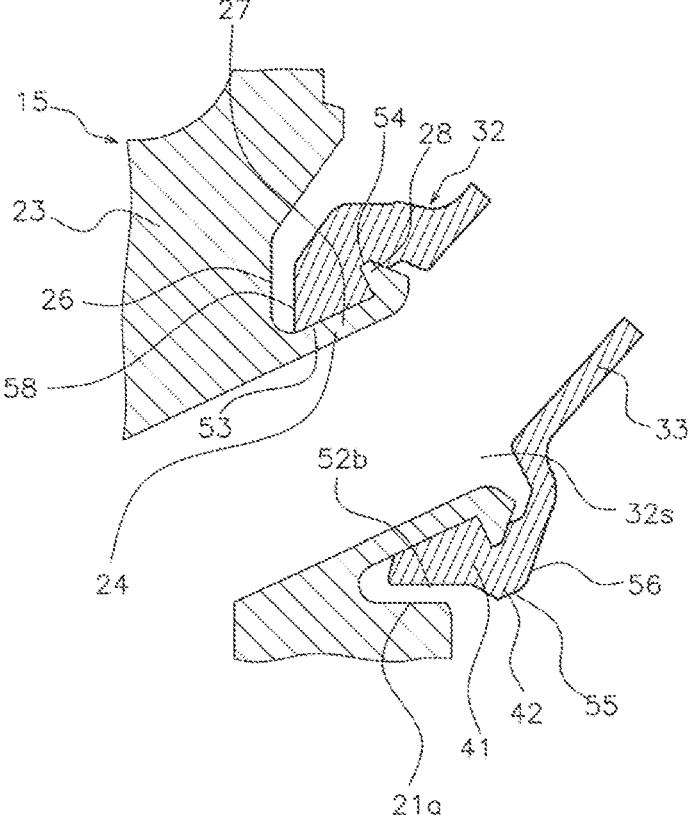
FIG. 13 is a partial cross-sectional view illustrating a state in which the attachment part of the boot according to the embodiment of the present disclosure is attached to the boot attachment part of the drive device main body.

FIG. 9 is a perspective view of attachment part 32. FIG. 10 is a perspective view of attachment part 32 viewed from a different direction from that of FIG. 9. FIG. 11A is a front view of attachment part 32. FIG. 11B is a side view of attachment part 32. FIG. 11C is a top view of attachment part 32. FIG. 11D is a bottom view of attachment part 32. FIG. 12 is a side view illustrating a state in which attachment part 32 of boot 12 is attached to boot attachment part 24 of drive device main body 11. FIG. 13 is a partially enlarged cross-sectional view of FIG. 12.

As illustrated in FIG. 5, of longitudinal direction D of boot 12, a direction toward vehicle body attachment part 34 is defined as first longitudinal direction D1, and a direction toward the attachment part 32 side is defined as second longitudinal direction D2. In addition, in the side view of FIG. 11B, the direction along end 33a of bellow part 33 is defined as inclination direction E. Of inclination direction E, one direction is defined as first inclination direction E1 (direction toward below-described protruding part 42), and the other direction opposite to first inclination direction E1 is defined as a second inclination direction E2. The direction perpendicular to longitudinal direction D in the top view of FIG. 11C is defined as width direction F. Of width direction F, one direction is defined as first width direction F1, and the other direction opposite to first width direction F1 is defined as second width direction F2.

As illustrated in FIGS. 5 and 6, attachment part 32 is disposed at the end of bellow part 33 on the side opposite from vehicle body attachment part 34. As illustrated in FIGS. 9 and 10, attachment part 32 includes attachment part main body 41 and protruding part 42. Attachment part main body 41 is attached to boot attachment part 24. Protruding part 42 is formed to drain rainwater. In a state in which attachment part 32 is attached to boot attachment part 24, protruding part 42 protrudes toward the outside of drive device main body 11, as illustrated in FIGS. 12 and 13.

Attachment Part Main Body 41

As illustrated in FIG. 13, boot attachment part 24 described above is inserted into attachment part main body 41. Attachment part main body 41 is formed to cover boot attachment part 24 and has a substantially cylindrical shape. As illustrated in FIG. 5, attachment part main body 41 is formed to have a larger outer diameter than that of bellow part 33. As illustrated in FIGS. 11A and 11B, attachment part main body 41 includes end surface 51, outer peripheral surface 52, opening 53, and groove part 54 (see FIG. 13).

End surface 51 is formed outward from end 33a of bellow part 33. Specifically, as illustrated in FIGS. 11B and 11D, end surface 51 is formed to protrude from end 33a radially outward other than second inclination direction E2. End surface 51 is formed parallel to end 33a of bellow part 33.

Outer peripheral surface 52 is formed perpendicularly to end surface 51 from end surface 51 and end 33a. As illustrated in FIG. 11B, outer peripheral surface portion 52a, which is a portion of outer peripheral surface 52 on the second inclination direction E2 side, is formed from end 33a, and a portion of outer peripheral surface 52 other than outer peripheral surface portion 52a is formed from the end of end surface 51. Outer peripheral surface portion 52a is a portion on which an operator's fingers are placed when boot 12 is attached to drive device main body 11.

In a state in which attachment part 32 is attached to boot attachment part 24, tip 58 of outer peripheral surface 52 is formed to face side surface part 26, as illustrated in FIG. 12.

As illustrated in FIG. 11B, tip 58 of outer peripheral surface 52 is provided to be inclined with respect to the end surface 51. As illustrated in FIG. 11B, tip 58 is formed in such a way that the distance from tip 51 to end surface 51 generally increases toward first inclination direction E1. As in the side view illustrated in FIG. 11B, tip 58 includes first boot side portion 58a, second boot side portion 58b, and third boot side portion 58c. First boot side portion 58a is the end portion of tip 58 on the first inclination direction E1 side. Third boot side portion 58c is the end portion of tip 58 on the second inclination direction E2 side. Second boot side portion 58b is disposed between first boot side portion 58a and third boot side portion 58c. As FIG. 11B is a side view, only one second boot side portion 58b is illustrated. However, as tip 58 is annular, there is also second boot side portion 58b on the back side of the drawing (see FIG. 11A). In the side view, first boot side portion 58a is formed to be inclined with respect to second boot side portion 58b. First boot side portion 58a is formed to be inclined with respect to second boot side portion 58b in such a way that the distance from first boot side portion 58a to extension line T1 (extending from second boot side portion 58b toward first inclination direction E1) increases toward first inclination direction E1. In the side view, third boot side portion 58c is formed to be inclined with respect to second boot side portion 58b. Third boot side portion 58c is formed to be inclined with respect to second boot side portion 58b in such a way that the distance from third boot side portion 58c to extension line T2 (extending from second boot side portion 58b toward second inclination direction E2) increases toward second inclination direction E2.

In a state in which attachment part 32 is attached to boot attachment part 24, first boot side portion 58a faces first main body side portion 26a, second boot side portion 58b faces second main body side portion 26b, and third boot side portion 58c faces third main body side portion 26c, as illustrated in FIG. 12.

As illustrated in FIGS. 11A and 11B, outer peripheral surface 52 includes flat surface part 52b. Flat surface part 52b is disposed at the outer peripheral surface 52 on the first inclination direction E1 side. In a state in which attachment part 32 is attached to boot attachment part 24, flat surface part 52b faces end surface 21a of drive device main body 11. In addition, gap Z is formed between flat surface part 52b and end surface 21a, as illustrated in FIG. 12.

As illustrated in FIG. 11A, opening 53 is formed inside tip 58 of outer peripheral surface 52. Boot attachment part 24 is inserted into opening 53. Tip 58 forms the edge of opening 53. Opening 53 has a circular shape. Opening 53 communicates with insertion hole 31a (see FIG. 5), which is provided inside boot main body 31 and through which an electric wire is inserted.

As illustrated in FIG. 13, groove part 54 fits to projection part 28 of boot attachment part 24. Groove part 54 is configured such that a space formed by the pair of side surfaces of groove part 54 and the bottom surface of groove part 54 communicates with internal space 32s that communicates with opening 53 of attachment part 32. Specifically, groove part 54 is a recess into which projection part 28 is inserted, and is formed all around the inner wall of internal space 32s. Groove part 54 is formed in a circular shape. When attachment part 32 is pushed into boot attachment part 24 so that boot attachment part 24 is inserted inside opening 53, projection part 28 is fitted into groove part 54 due to elastic deformation of attachment part 32.

Protruding Part 42

Protruding part 42 discharges rainwater that has flowed from boot main body 31 and reached attachment part 32, from boot 12. As illustrated in FIG. 11B, protruding part 42 is disposed between flat surface part 52b and end surface 51. Protruding part 42 protrudes toward first inclination direction E1. Further, in a state in which attachment part 32 is attached to boot attachment part 24, protruding part 42 protrudes toward the outside of drive device main body 11, as illustrated in FIG. 12. In the present embodiment, protruding part 42 protrudes toward first extension/retraction direction A1 as illustrated in FIG. 12; however, the configuration is not limited thereto, and protruding part 42 may protrude radially outward of outer cylinder part 21. It is preferable that protruding part 42 protrudes so as to guide rainwater to the outside of drive device main body 11. For example, the tip (tip part 55) of protruding part 42, while boot 12 is attached to drive device main body 11, can be positioned radially outward of end surface 21a of drive device main body 11. Such a configuration can prevent rainwater that has flowed along protruding part 42 from accumulating on end surface 21a of drive device main body 11 while the opening/closing body is moving from the opened position to the closed position or in the closed state of the opening/closing body. As illustrated in FIG. 11B, protruding part 42 includes tip part 55, inclined surface 56 (an example of a pressed part), and guide surface 57.

In the present embodiment, protruding part 42 has a substantially triangular shape in the front view (FIGS. 9 and 11A), and a substantially triangular shape in the side view (FIG. 11B).

Tip part 55 is an end part of protruding part 42 on the first inclination direction E1 side. Tip part 55 is an apex portion of the substantially triangular shape in the front view, and is an apex portion of the substantially triangular shape in the side view.

Inclined surface 56 is a surface that connects the portion of end surface 51 on the first inclination direction E1 side with tip part 55, and is a surface of protruding part 42 on the boot main body 31 side. In a state in which attachment part 32 is attached to boot attachment part 24, inclined surface 56 is inclined so as to approach drive device main body 11 from the end surface 51 side toward tip part 55, as illustrated in FIG. 13. In addition, inclined surface 56 is inclined so as to be located radially outward from central axis B of boot main body 31 as the distance from inclined surface 56 to end surface 51 increases.

As illustrated in FIG. 11D, inclined surface 56 has a width along width direction F which becomes shorter toward tip part 55 (toward first inclination direction E1). Therefore, guide surface 57 is formed in a substantially triangular shape when viewed from a direction perpendicular to inclination direction E, as illustrated in the perspective views of FIGS. 9 and 10.

Guide surface 57 guides rainwater falling onto attachment part main body 41 to tip part 55. Guide surface 57 is disposed at the end of protruding part 42 in the circumferential direction. Guide surface 57 connects outer peripheral surface 52 of attachment part main body 41 with tip part 55. In the present embodiment, guide surfaces 57 are disposed at both ends of protruding part 42 in the circumferential direction. That is, the pair of guide surfaces 57 are disposed with tip part 55 therebetween in the circumferential direction. The circumferential direction is a direction around a circle centered on longitudinal direction D. It can be said that guide surfaces 57 are disposed at tip part 55 on both the first width direction F1 side and the second width direction F2 side as in FIG. 11D.

As illustrated in FIG. 11B, guide surface 57 has a width (perpendicular to inclination direction E and parallel to longitudinal direction D) which becomes narrower from the portion adjacent to outer peripheral surface 52 toward tip part 55 (toward first inclination direction E1). Therefore, guide surface 57 is formed in a substantially triangular shape in the side view.

In the present embodiment, guide surface 57 is formed in a shape of a flat surface; however, guide surface 57 is not limited to a flat surface and may be curved. In addition, the pair of guide surfaces 57 are formed symmetrically, as illustrated in FIGS. 11A and 11D; however, the surfaces do not have to be symmetrical.

Attaching Boot to Drive Device Main Body

Figure 14A:
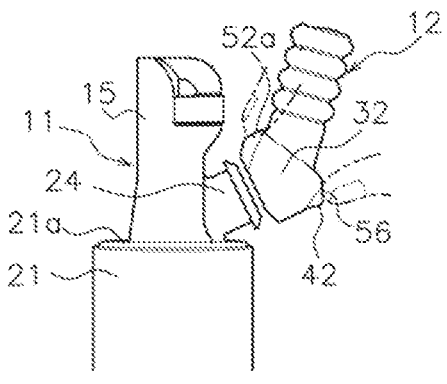
FIGS. 14A to 14C illustrate the operation of attaching the boot to the drive device main body.
Figure 14B:
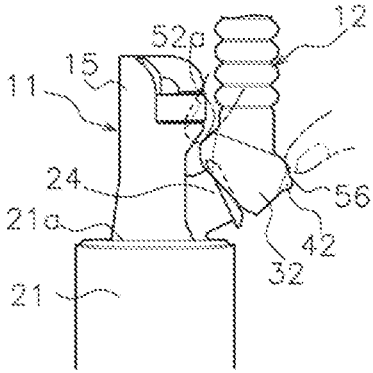
Figure 14C:
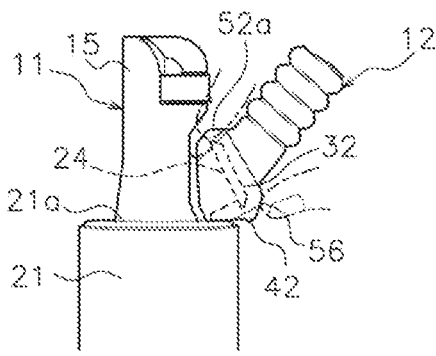

FIGS. 14A to 14C illustrate the operation of attaching boot 12 to drive device main body 11.

As illustrated in FIG. 14A, an operator grasps outer peripheral surface portion 52a and inclined surface 56 with fingers (indicated by dotted lines) and brings attachment part 32 of boot 12 close to boot attachment part 24 of drive device main body 11.

As illustrated in FIG. 14B, attachment part 32 is then fitted to boot attachment part 24 from outer peripheral surface portion 52a. At this time, by pressing the outer peripheral surface portion 52a with a finger, projection part 28 fits into the portion of groove part 54 on the outer peripheral surface portion 52a side (the portion on the first inclination direction E1 side).

Figure 14D:
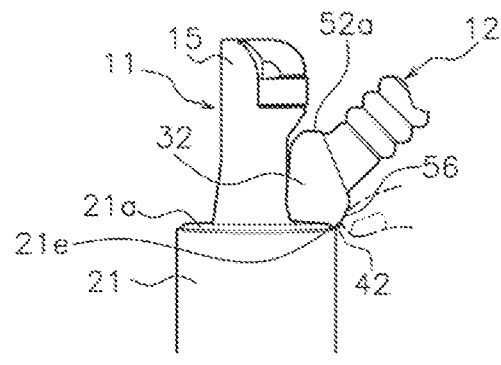
FIG. 14D illustrates a state in which a protruding part of the boot comes into contact with the drive device main body.

Subsequently, as illustrated in FIG. 14C, projection part 28 is fitted into the portion of groove part 54 on the inclined surface 56 side (the portion on the second inclination direction E2 side) by pressing inclined surface 56 toward boot attachment part 24 with a finger. When inclined surface 56 is pressed with the finger, protruding part 42 comes into contact with edge 21e (an example of an end part of the drive device main body) of end surface 21a of drive device main body 11, as illustrated in FIG. 14D. This configuration restricts the insertion of attachment part 32 into boot attachment part 24, making positioning and attachment easier without being excessively pushed.

Figure 14E:
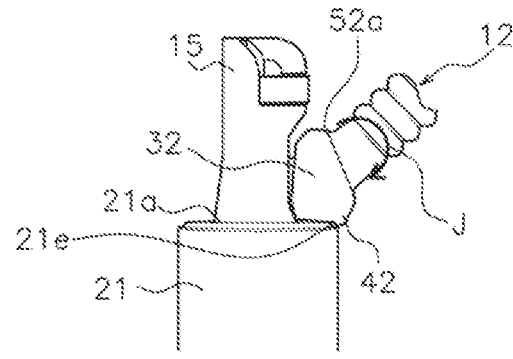
FIG. 14E illustrates a state in which the boot sways and the protruding part of the boot comes into contact with the drive device main body.

In the attached state, when boot 12 sways accompanied by the opening and closing of opening/closing body 2 (see arrow J), as illustrated in FIG. 14E, protruding part 42 comes into contact with edge 21e of end surface 21a of drive device main body 11. Therefore, the sway of the boot 12 can be limited to stabilize the attached posture of boot 12 and prevent the boot from coming off.

Effects and the Like

Figure 15A:
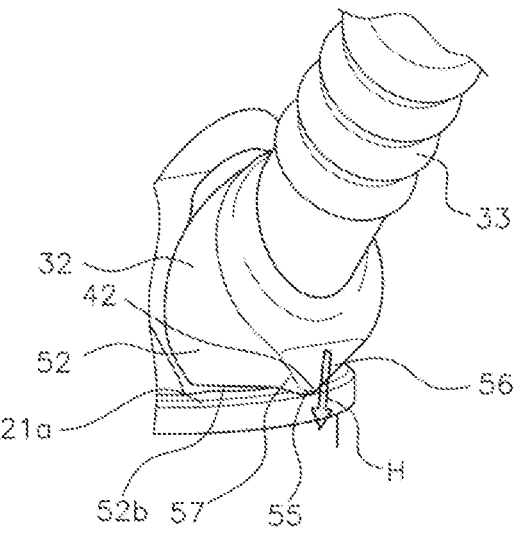
FIGS. 15A and 15B illustrate perspective views of a state in which the attachment part of the boot according to the embodiment of the present disclosure is attached to the boot attachment part of the drive device main body.
Figure 15B:
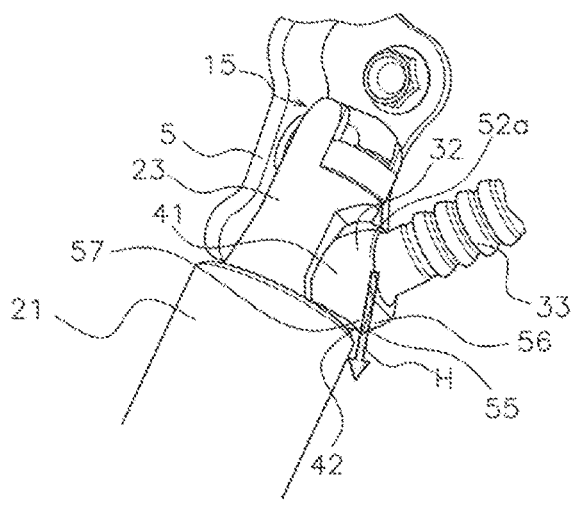

As described above, with the provision of protruding part 42 that protrudes toward the outside of drive device main body 11 on attachment part 32, rainwater can be drained through protruding part 42 so that rainwater does not accumulate in boot 12. When opening/closing body 2 is open as illustrated in FIG. 7, rainwater falls on bellow part 33 and attachment part 32 (see arrows Y), and the rainwater accumulates in boot 12. When opening/closing body 2 is closed in this state as illustrated in FIG. 8, the rainwater flows along bellow part 33 and collects on attachment part 32 as indicated by arrows G. However, the rainwater is guided to tip part 55 via inclined surface 56 and guide surface 57 and is discharged from tip part 55 (see arrow H). FIGS. 15A and 15B are perspective views from a different viewing direction from that of FIG. 8. As illustrated in FIGS. 15A and 15B, protruding part 42 protrudes toward the outside of the drive device main body 11; thus rainwater flowing down from protruding part 42 is discharged to the outside of drive device main body 11. Therefore, it is possible to prevent rainwater from accumulating on end surface 21a of drive device main body 11.

Rainwater having flowed from the boot main body is allowed to flow along inclined surface 56 and discharged from tip part 55 of protruding part 42 by providing inclined surface 56 on protruding part 42—inclined surface 56 is formed so as to approach drive device main body 11 as the distance from inclined surface 56 to tip part 55 of protruding part 42 decreases, as illustrated in FIG. 11B.

In addition, protruding part 42 is provided with inclined surface 56 (an example of a pressed part), which is provided on the boot main body 31 side and is pressed during the attachment of boot 12 to drive device main body 11. This configuration allows boot 12 to be attached to drive device main body 11 by pressing inclined surface 56 toward the drive device main body 11 side, providing boot attachment part 24 of drive device 1 inclined with respect to end surface 21a. Therefore, the boot can be easily attached even when the space for attaching boot 12 is small.

In addition, protruding part 42 is provided with guide surface 57 that is disposed at an end in the circumferential direction of the protruding part and connects outer peripheral surface 52 with tip part 55. Rainwater having flowed from boot main body 31 is thus allowed to flow along guide surface 57 and discharged from tip part 55 of protruding part 42

In addition, drive device main body 11 is provided with vehicle body side end part 15, which protrudes from end surface 21a (at the end in extension/retraction direction A) of telescopic part 13, and to which attachment part 32 of boot 12 is attached. With such a configuration, rainwater that has flowed along boot main body 31 and reached attachment part 32 is discharged from protruding part 42, thereby preventing rainwater from accumulating in boot 12.

Design

The present specification also discloses the entire design of the boot and the partial design of the boot as described below.

Figure 16:
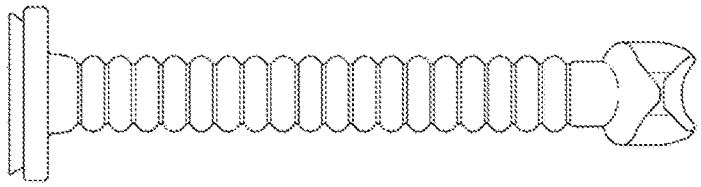
FIG. 16 is a plan view of the design of the boot according to the embodiment of the present disclosure.
Figure 17:
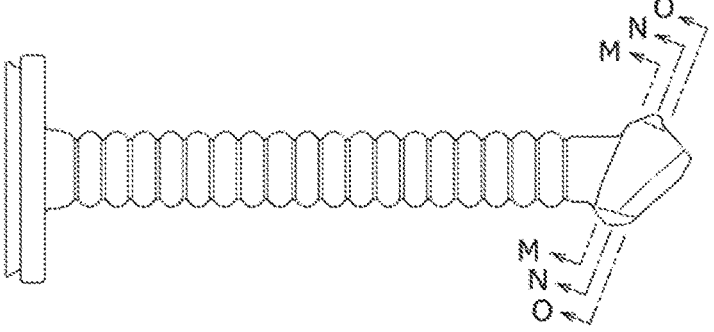
FIG. 17 is a front view of the design of the boot according to the embodiment of the present disclosure.
Figure 18:
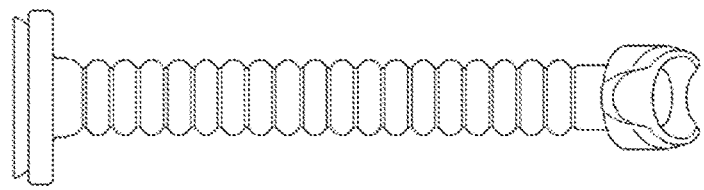
FIG. 18 is a bottom view of the design of the boot according to the embodiment of the present disclosure.
Figure 19:
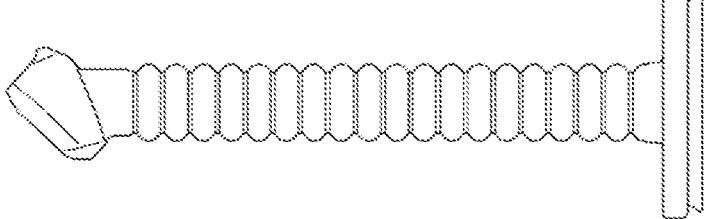
FIG. 19 is a rear view of the design of the boot according to the embodiment of the present disclosure.
Figure 20:
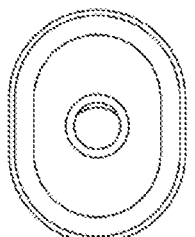
FIG. 20 is a left side view of the design of the boot according to the embodiment of the present disclosure.
Figure 21:
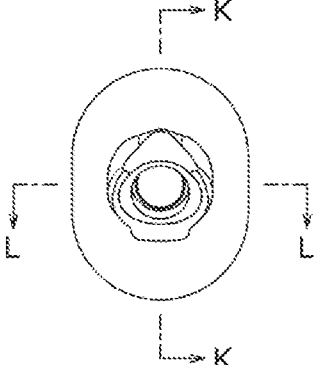
FIG. 21 is a right side view of the design of the boot according to the embodiment of the present disclosure.
Figure 22:
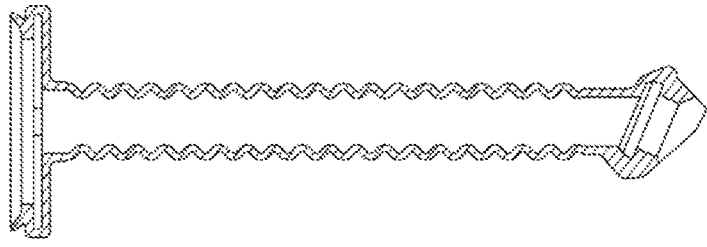
FIG. 22 is a cross-sectional view taken along arrows K-K in FIG. 21.
Figure 23:
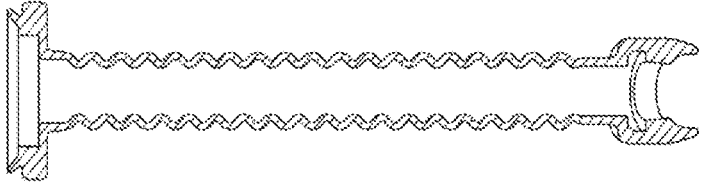
FIG. 23 is a cross-sectional view taken along arrows L-L in FIG. 21.
Figure 24:
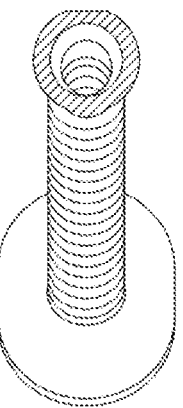
FIG. 24 is a cross-sectional view taken along arrows M-M in FIG. 17.
Figure 25:
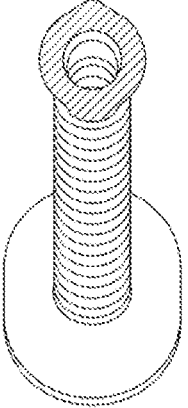
FIG. 25 is a cross-sectional view taken along arrows N-N in FIG. 17.
Figure 26:
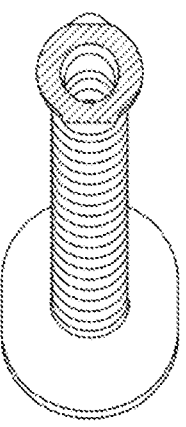
FIG. 26 is a cross-sectional view taken along arrows O-O in FIG. 17.

FIGS. 16 to 21 are six diagrams of the entire design of the boot according to the embodiment described above. FIG. 16 is a plan view of the boot. FIG. 17 is a front view of the boot. FIG. 18 is a bottom view of the boot. FIG. 19 is a rear view of the boot. FIG. 20 is a left side view of the boot. FIG. 21 is a right side view of the boot. FIG. 22 is a reference diagram of the design of the boot. FIG. 22 is a reference cross-sectional view taken along arrows K-K in FIG. 21. FIG. 23 is a reference cross-sectional view taken along arrows L-L in FIG. 21. FIGS. 24 to 26 are reference diagrams of the design of the boot, and are cross-sectional views of attachment part 32. FIG. 24 is a reference cross-sectional view taken along arrows M-M in FIG. 17. FIG. 25 is a reference cross-sectional view taken along arrows N-N in FIG. 17. FIG. 26 is a reference cross-sectional view taken along arrows O-O in FIG. 17.

Figure 27:
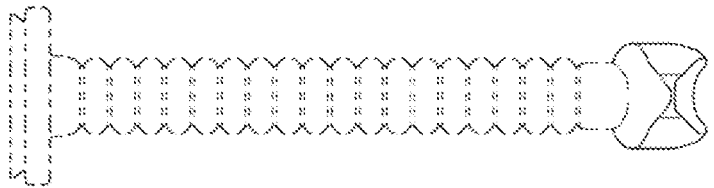
FIG. 27 is a plan view of a partial design of the boot according to the embodiment of the present disclosure.
Figure 28:
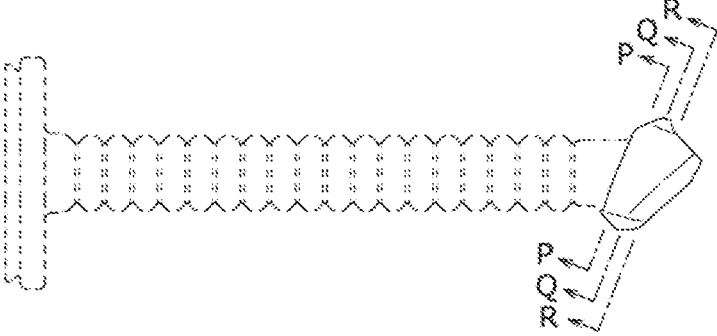
FIG. 28 is a front view of a partial design of the boot according to the embodiment of the present disclosure.
Figure 29:
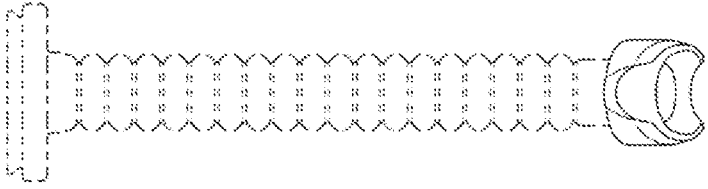
FIG. 29 is a bottom view of a partial design of the boot according to the embodiment of the present disclosure.
Figure 30:
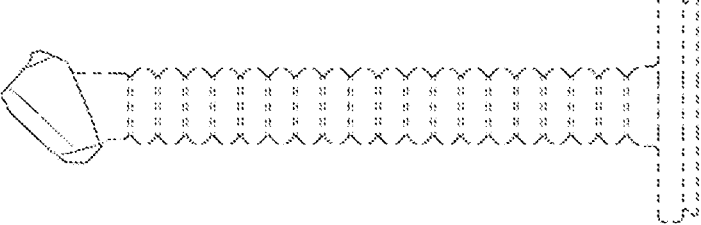
FIG. 30 is a rear view of a partial design of the boot according to the embodiment of the present disclosure.
Figure 31:
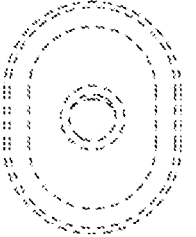
FIG. 31 is a left side view of a partial design of the boot according to the embodiment of the present disclosure.
Figure 32:
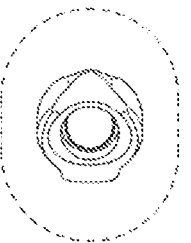
FIG. 32 is a right side view of a partial design of the boot according to the embodiment of the present disclosure.
Figure 33:
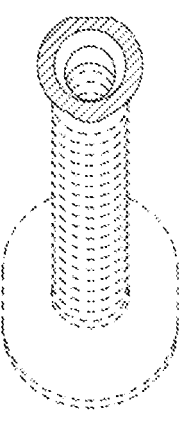
FIG. 33 is a cross-sectional view taken along arrows P-P in FIG. 28.
Figure 34:
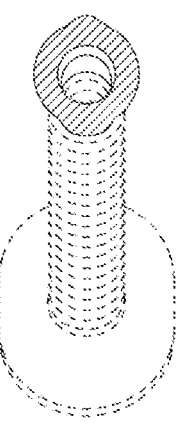
FIG. 34 is a cross-sectional view taken along arrows Q-Q in FIG. 28.
Figure 35:
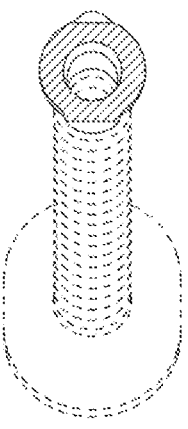
FIG. 35 is a cross-sectional view taken along arrows R-R in FIG. 28.

FIGS. 27 to 32 are six diagrams of the partial design of the boot according to the embodiment. In FIGS. 27 to 32, portions that are understood as partial designs are indicated with solid lines, and other portions are indicated with broken lines. The portion indicated by a solid line in FIGS. 27 to 32 corresponds to attachment part 32 of boot 12 and to be attached to drive device main body 11. FIG. 27 is a plan view of the boot. FIG. 27 is the same diagram as FIG. 16 except for whether a line is a broken line or a solid line. FIG. 28 is a front view of the boot. FIG. 28 is the same diagram as FIG. 17 except for whether a line is a broken line or a solid line. FIG. 29 is a bottom view of the boot. FIG. 29 is the same diagram as FIG. 18 except for whether a line is a broken line or a solid line. FIG. 30 is a rear view of the boot. FIG. 30 is the same diagram as FIG. 19 except for whether a line is a broken line or a solid line. FIG. 31 is a left side view of the boot. FIG. 31 is the same diagram as FIG. 20 except for whether a line is a broken line or a solid line. FIG. 32 is a right side view of the boot. FIG. 32 is the same diagram as FIG. 21 except for whether a line is a broken line or a solid line. FIGS. 33 to 35 are reference diagrams of the partial design of the boot, and are cross-sectional views of attachment part 32. FIG. 33 is a reference cross-sectional view taken along arrows P-P in FIG. 28. FIG. 34 is a reference cross-sectional view taken along arrows Q-Q in FIG. 28. FIG. 35 is a reference cross-sectional view taken along arrows R-R in FIG. 28.

Other Embodiments

Although one embodiment of the present disclosure has been described above, the present disclosure is not limited to the above embodiment, and various changes can be made without departing from the scope of the present disclosure.

A. In the above embodiment, protruding part 42 has a substantially triangular shape in the front view and side view, and tip part 55 is the apex portion of both triangular shapes, but the shape of protruding part 42 is not limited to this as long as rainwater can be drained.

Figure 36A:
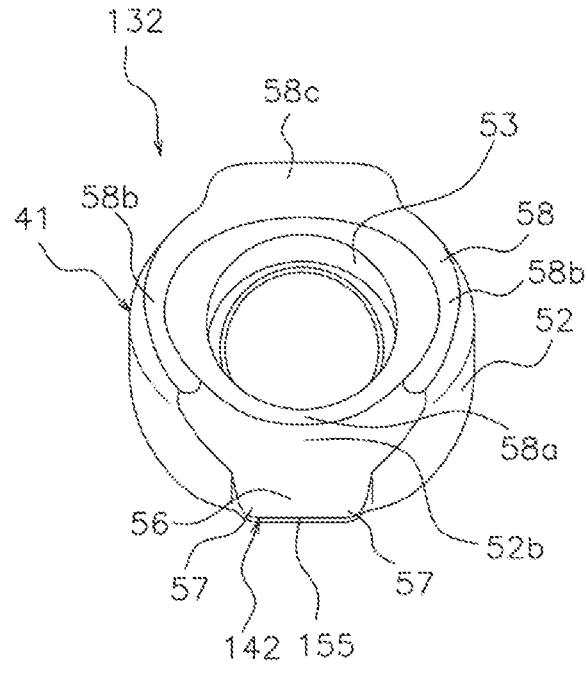
FIG. 36A illustrates a front view of an attachment part in a variation according to the embodiment of the present disclosure.
Figure 36B:
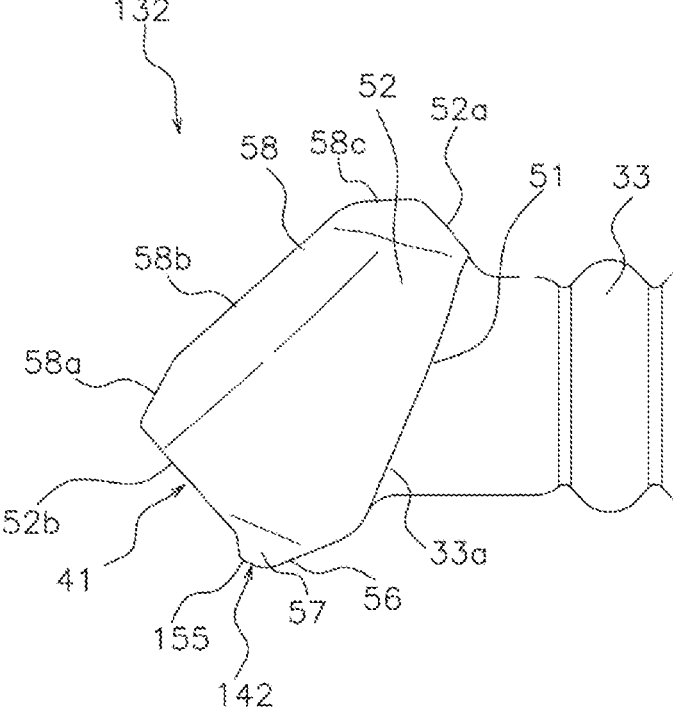
FIG. 36B illustrates a side view of the attachment part in the variation according to the embodiment of the present disclosure.

FIG. 36A is a front view illustrating attachment part 132 in a variation of the embodiment. FIG. 36B is a side view of attachment part 132.

Attachment part 132 is provided with protruding part 142 that has a different shape from that of the above embodiment. Protruding part 142 has a substantially rectangular shape in the front view, and a substantially triangular shape in the side view. Tip part 155 of protruding part 142 is a straight line portion of the side of the substantially rectangular shape in the front view, and is an apex portion of the substantially triangular shape in the side view. Even with such a shape, rainwater can be drained from protruding part 142. Further, although not illustrated, the protruding part may have a substantially triangular shape in the front view, and may have a substantially rectangular shape in the side view.

B. In the above embodiment, inclined surface 56 is formed in a shape of a flat surface, but inclined surface 56 is not limited to a flat surface and may be curved or may have unevenness. However, inclined surface 56 is preferably formed smoothly for guiding rainwater to the tip part. In summary, the inclined surface may have any shape as long as it allows rainwater to flow along inclined surface 56 to tip part 55.

C. In the above embodiment, inclined surface 56 has the function of guiding rainwater to tip part 55 and the function of a pressed part to be pressed during the attachment of attachment part 32 to boot attachment part 24. When it is sufficient for inclined surface 56 only to function as a pressed part, inclined surface 56 may be formed with unevenness so that it can be easily pressed with a finger.

D. In the above embodiment, guide surfaces 57 are provided at both ends of protruding part 42 in the circumferential direction, but guide surface 57 may be formed only at one end. In this case, the effect of guiding rainwater to the tip is inferior compared to the case where guide surfaces 57 are provided at both ends, but the guiding performance of rainwater is improved compared to a configuration in which no guide surface 57 is formed.

E. In the above embodiment, guide surface 57 is formed in a shape of a substantially flat surface, but guide surface 57 may be curved or may have unevenness. However, guide surface 57 is preferably formed smoothly for guiding rainwater to the tip part. In summary, guide surface 57 may have any shape as long as it can guide rainwater that has flowed along bellow part 33 and into attachment part main body 41 to tip part 55 of protruding part 42.

F. In the above embodiment, gap Z is formed between flat surface part 52b of attachment part 32 and end surface 21a of drive device main body 11, but the gap does not need to be formed.

INDUSTRIAL APPLICABILITY

The drive device and boot of the present disclosure have the effect of preventing the accumulation of rainwater in the boot, and are particularly advantageous, for example, as a drive device for opening and closing a back door of a vehicle body.

REFERENCE SIGNS LIST

1 Drive device
2 Opening/closing body
3 Vehicle body
11 Drive device main body
12 Boot
31 Boot main body
32 Attachment part
42 Protruding part

The invention claimed is:

1. A drive device for opening and closing an opening/closing body that is supported by a vehicle body in an openable and closable manner, the drive device comprising:

a drive device main body connected to the vehicle body and the opening/closing body, the drive device main body being telescopic; and a boot through which a wire extending from the drive device main body passes, wherein the boot includes a boot main body configured to be attachable to the vehicle body, and an attachment part to be attached to the drive device main body, the attachment part being disposed at an end of the boot main body, and the attachment part includes a protruding part disposed outside the drive device main body and protruding toward an outside of the drive device main body in a state in which the attachment part is attached to the drive device main body.

2. The drive device according to claim 1, wherein:

the protruding part includes an inclined surface inclined with respect to an extension/retraction direction of the drive device main body, the inclined surface being provided on a side of the boot main body, and the inclined surface is configured so as to approach the drive device main body as a distance from the inclined surface to a tip part of the protruding part decreases.

3. The drive device according to claim 1, wherein the protruding part includes a pressed part that is pressed during attachment of the boot to the drive device main body, the pressed part being provided on a side of the boot main body.

4. The drive device according to claim 1, wherein:

the protruding part is disposed on an outer peripheral surface of the attachment part; and the protruding part includes a tip part, and a guide surface connecting the outer peripheral surface with the tip part, the guide surface being disposed at an end of the protruding part in a circumferential direction of the protruding part.

5. The drive device according to any one of claim 1, wherein:

the attachment part is attached to the drive device main body by fitting;

the drive device main body includes a fitted part to which the attachment part fits; and the protruding part is configured to be capable of coming into contact with an end part of the drive device main body.

6. The drive device according to claim 1, wherein:

the drive device main body includes a telescopic part, and an attachment end part to which the attachment part of the boot is attached and which protrudes from an end surface of the telescopic part, the end surface being an end surface in an extension/retraction direction of the telescopic part.

7. A boot through which a wire of a drive device for opening and closing an opening/closing body passes, the opening/closing body being supported by a vehicle body in an openable and closable manner, the boot comprising:

a boot main body configured to be attachable to the vehicle body; and an attachment part configured to be attachable to a drive device main body, the attachment part being disposed at an end of the boot main body, wherein the attachment part includes a protruding part disposed outside the drive device main body and protruding toward an outside of the drive device main body in a state in which the attachment part is attached to the drive device main body.

8. A drive device for opening and closing an opening/closing body that is supported by a vehicle body in an openable and closable manner, the drive device comprising:

a drive device main body connected to the vehicle body and the opening/closing body, the drive device main body being telescopic; and a boot through which a wire extending from the drive device main body passes, wherein the boot includes a boot main body configured to be attachable to the vehicle body, and an attachment part to be attached to the drive device main body, the attachment part being disposed at an end of the boot main body, the attachment part includes a protruding part protruding toward an outside of the drive device main body, the protruding part includes an inclined surface inclined with respect to an extension/retraction direction of the drive device main body, the inclined surface being provided on a side of the boot main body, and the inclined surface is configured so as to approach the drive device main body as a distance from the inclined surface to a tip part of the protruding part decreases.

9. A boot through which a wire of a drive device for opening and closing an opening/closing body passes, the opening/closing body being supported by a vehicle body in an openable and closable manner, the boot comprising:

a boot main body configured to be attachable to the vehicle body; and an attachment part configured to be attachable to a drive device main body, the attachment part being disposed at an end of the boot main body, wherein the attachment part includes a protruding part protruding toward an outside of the drive device main body in a state in which the protruding part is attached to the drive device main body, the protruding part includes an inclined surface inclined with respect to an extension/retraction direction of the drive device main body, the inclined surface being provided on a side of the boot main body, and the inclined surface is configured so as to approach the drive device main body as a distance from the inclined surface to a tip part of the protruding part decreases.

* * * * *